United States Patent Office 2,750,268
Patented June 12, 1956

2,750,268

SILICON NITRIDE

Hendrik D. Erasmus, Lewiston, and William D. Forgeng, Niagara Falls, N. Y., assignors to Union Carbide and Carbon Corporation, a corporation of New York No Drawing. Application May 1, 1952,
Serial No. 285,561

9 Claims. (Cl. 51—307)

This invention relates to silicon nitride, and particularly to improved abrasives comprising silicon nitride, to a method for making such improved abrasives, and to a novel method for abrading articles by rubbing them with the novel abrasive material.

We have found that silicon nitride is an excellent abrasive for abrading material from hard substances such as steel, cast iron, cobalt-chromium-tungsten alloys, synthetic sapphire crystals, brass, aluminum, and others. For some materials it excels silicon carbide and alumina. Micro hardness tests at 20° C. have shown that it is as hard as silicon carbide, and possibly harder.

The silicon nitride can be prepared in any suitable way, as by nitriding of silicon or ferrosilicon at a high temperature with nitrogen or ammonia, or by the reaction of silicon tetrachloride with ammonia followed by calcining.

Silicon nitride exists as a finely-divided, unbonded, chemically inert powder having a fineness between about 0.02 and about 20 microns. Such powder in 3 micron average particle size has been used alone in an unbonded condition, as well as bonded into sticks with soft wax or a similar binder, for polishing or lapping. Such sticks can be used for coating cloth buffing wheels while they operate. Samples of cast iron, cobalt-chromium-tungsten alloy, and synthetic sapphire were polished more rapidly and effectively than when silicon carbide and alumina were used. Steel and brass have also been successfully polished. On hard alloyed cast iron it caused less undercutting of the graphite and less relief of carbide than did levigated alumina.

Silicon nitride also has been prepared as a compact self-bonded abrasive and used effectively as a whetstone (e. g. a flat sharpening stone, or a grinding wheel) for abrading hard materials such as glass, quartz, and topaz.

Another procedure for preparing a compact bonded abrasive from silicon nitride powder is to mix the nitride particles with at least one suitable adhesive bonding agent such as glue, magnesium oxychloride cement, silicate of soda, shellac, rubber, a resinoid such as a phenol formaldehyde synthetic resin, clay or feldspar so that the bonding agent becomes dispersed between the particles of the nitride and holds them together. The mix is then molded to any desired shape, as to the shape of a grinding wheel, and is cured to secure a tight bond between the particles of the nitride (as is well known in the art of manufacturing grinding wheels). An abrasive containing a rubber binder is cured by vulcanization; abrasives containing clay or feldspar are cured by vitrification at a high temperature; abrasives containing the other named binders are cured by baking at moderate temperatures.

Abrasive whetstones have also been made successfully by molding the desired shape, such as a cylindrical or disc-shaped grinding wheel, from particles of substantially pure silicon (e. g. 97% Si) or ferrosilicon (e. g. 75% Si) and then heating the shape in an atmosphere of substantially pure nitrogen at a temperature high enough to convert a substantial portion of the silicon to silicon nitride and simultaneously to effect a permanent bond between the particles.

The particles of silicon or ferrosilicon can be shaped in any suitable way before heating. It is advantageous to bond the particles of silicon or ferrosilicon together temporarily before heating by mixing them with a decomposable or vaporizable organic binder such as a water-glucose solution, molasses, or glycerine and compressing them in a suitably shaped mold, after which the shape is removed and heated. The particles also can be placed in a graphite mold and nitrided in the mold.

The shape is placed in a furnace such as a carbon resistor electric furnace, and heated to the bonding and nitriding temperature while passing substantially pure nitrogen gas through the furnace in contact with the shape. Nitriding and bonding advantageously are obtained by maintaining the furnace temperature above about 1000° C., but below about 1600° C. to prevent decomposition of the nitride, and progressively heating the shape through a range of temperatures within the foregoing range.

The extent of nitrogenization depends to some extent on particle size. When the silicon particle size averaged 3 microns a nitrogen content of 38% was obtained. Coarser particles gave a smaller nitrogen content.

In a whetstone produced as described above by nitriding silicon or ferrosilicon, each particle generally comprises a core of silicon or ferrosilicon having a surface layer of silicon nitride. Additionally, there is usually present a small percentage of microscopic crystals of silicon carbide which are formed by the reaction of silicon with the carbonaceous residue of the temporary glucose binder, and with carbon vaporized from the resistors of the sintering furnace.

It has been found by chemical analysis that in our improved whetstones silicon nitride predominates as the abrasive, the silicon combined with nitrogen as silicon nitride constitutes at least 50% by weight of the chemically combined silicon, and the ratio of silicon nitride to any silicon carbide present is at least about 2 to 1 and often much greater.

With ferrosilicon it is advantageous to use a grade containing at least 65% of nitridable silicon by weight. With lower grades there is a tendency for the molded shape to grow and distort during sintering, and the particles sometimes are poorly bonded.

Unbonded silicon and ferrosilicon particles also can be nitrided in the manner described above. If sintering occurs the resulting mass is disintegrated and sized. The wholly or partially nitrided particles then can be mixed with an adhesive material, shaped, and cured as described previously herein for substantially pure silicon nitride particles.

Examples of the invention follow. In Examples 2, 3, and 5 the grinding rate is in grams of metal removed per minute.

*Example 1*

A grinding wheel one-half inch thick and four inches in diameter was molded under a pressure of 850 pounds per square inch from 97% silicon particles averaging 3 microns, using as a temporary binder 5 milliliters of a 50% glucose-water solution for 100 grams of silicon. The wheel was then fired in a pure nitrogen atmosphere 16 hours at a temperature of 1200° C. and 8 hours at 1300° C. The wheel was tested under an 8 pound load and found to dull a diamond wheel-dressing tool very rapidly.

A chemical analysis showed that the wheel contained 87.6% silicon nitride and 4.7% silicon carbide, for a ratio of about 19 to 1. Also, 91% of the chemically combined silicon was present as silicon nitride.

*Example 2*

A similar grinding wheel was molded under a pressure of 1000 pounds per square inch from 97% silicon particles of a size to pass a sieve having .495 millimeter openings but to be retained on one having .417 millimeter openings, using a glucose solution binder. The wheel was then fired in a pure nitrogen atmosphere 24 hours at 1350° C., 20 hours at 1425°, 20 hours at 1500°, and 42 hours at 1400°. Upon testing the wheel under an 8 pound load the grinding rate was 3.5 for cold rolled steel, and 6.6 for cast iron.

Chemical analysis showed that the wheel contained 60% silicon nitride and 33% silicon carbide, for a ratio of about 2 to 1. Also, 59% of the chemically combined silicon was present as silicon nitride.

In contrast to the above examples, a grinding wheel was similarly molded from a mixture of 3 micron silicon and 16 grit silicon carbide in equal proportions by weight and fired in nitrogen for 70 hours at temperatures between 1100° and 1500° C. Upon similarly testing the wheel the grinding rate was only 1.0 for cold rolled steel. Chemical analysis showed that the wheel contained 38% silicon nitride and 55% silicon carbide, for a ratio of less than 1 to 1. Also only about 36% of the chemically combined silicon was present as silicon nitride.

*Example 3*

A similar grinding wheel was molded under a pressure of 1000 pounds per square inch from ferrosilicon particles containing 75% silicon, and of a size to pass a sieve having .295 millimeter openings but to be retained on one having .147 millimeter openings, using a glucose solution binder. The wheel was then fired in a pure nitrogen atmosphere 20 hours at 1100° C., 24 hours at 1200°, 37 hours at 1300°, and 40 hours at 1350°. Upon testing the wheel under an 8 pound load the grinding rate was found to be 1.5 on cold rolled steel, 1.9 on cast iron, 1.0 on brass, and 0.4 on aluminum.

Chemical analysis showed that the wheel contained 47% silicon nitride and 11% silicon carbide, for a ratio of 4 to 1. Also, 75% of the combined silicon was present as silicon nitride.

*Example 4*

A substantially pure silicon nitride honing stone ½ by 1½ by 6 inches was prepared by pressing at 250 pounds per spuare inch glucose-bonded silicon particles of 3 microns average size, and nitriding for 20 hours at 1200° C. to 1300° C. in an atmosphere of nitrogen. The honing stone was used successfully for sharpening knives.

*Example 5*

Silicon nitride grit was produced by nitriding silicon particles of a size to pass a sieve having .417 millimeter openings but to be retained on a sieve having .351 millimeter openings. The calculated analysis was 52.8% silicon nitride and 8.5% silicon carbide, with the remainder being mainly unnitrided silicon. The resulting grit was then formed into grinding wheels using binders of vitreous clay and phenolic resin.

Wheels having a vitreous clay binder, when tested under a 12 pound load, gave a grinding rate of 4.4 on cold rolled steel, 9.6 on cast iron, 4.5 on brass, and 1.8 on aluminum.

Wheels having a phenolic resin binder, when tested under a 12 pound load, gave a grinding rate of 10 on cold rolled steel, 7.3 on cast iron, 8 on brass, and 3.3 on aluminum.

*Example 6*

Silicon powder 43 microns and smaller was charged into a graphite grinding wheel mold and the whole placed in a furnace and heated in nitrogen to 1350° C. to obtain a grinding wheel 4 inches in diameter and 1 inch thick.

Silicon nitride also can be applied to a base, such as a thin solid flexible sheet of paper or cloth, and used successfully as a superior polishing tool. The surface of the cloth or paper is coated with a suitable adhesive binder such as glue and particles of finely-divided silicon nitride powder are embedded in the adhesive while the latter is still soft. Upon hardening of the binder the particles of silicon nitride are firmly held on the paper or cloth.

This application is in part a continuation of our application Serial No. 77,993, filed February 23, 1949, and now Patent No. 2,628,896.

What is claimed is:

1. A compact bonded abrasive whetstone in which silicon nitride predominates as the abrasive and which contains minor amounts of silicon carbide, the silicon of said silicon nitride constituting at least 50% by weight of the chemically combined silicon in said whetstone, and the ratio of silicon nitride to any silicon carbide present being at least about 2 to 1.

2. A compact bonded abrasive whetstone comprising nitrided silicon particles and containing minor amounts of silicon carbide, having surface layers of silicon nitride, silicon nitride predominating as the abrasive therein, the silicon of said silicon nitride constituting at least 50% by weight of the chemically combined silicon in said whetstone, and the ratio of silicon nitride to any silicon carbide present being at least about 2 to 1.

3. An abrasive whetstone in accordance with claim 2 wherein said nitrided silicon particles are self-bonded together.

4. A compact bonded abrasive whetstone comprising nitrided ferrosilicon particles and containing minor amounts of silicon carbide, having surface layers of silicon nitride, silicon nitride predominating as the abrasive therein, the silicon of said silicon nitride constituting at least 50% by weight of the chemically combined silicon in said whetstone, and the ratio of silicon nitride to any silicon carbide present being at least about 2 to 1.

5. An abrasive whetstone in accordance with claim 4 wherein said nitrided ferrosilicon particles are self-bonded together.

6. An abrasive stick consisting essentially of finely-divided particles of silicon nitride embedded in a soft wax-like binder.

7. A method for making an abrasive whetstone comprising silicon nitride which method comprises forming into a desired shape particles comprising at least 65% of nitridable silicon, and then nitriding said silicon and simultaneously effecting a permanent bond between said particles by heating said shape at a temperature between about 1000° C. and 1600° C. in an atmosphere of nitrogen.

8. A method in accordance with claim 7 wherein said particles are substantially pure silicon.

9. A method in accordance with claim 7 wherein said particles are ferrosilicon.

References Cited in the file of this patent

UNITED STATES PATENTS

| | | |
|---|---|---|
| 866,444 | Egly | Sept. 17, 1907 |
| 1,845,250 | Driscoll | Feb. 16, 1932 |
| 2,420,859 | Buckner | May 20, 1947 |
| 2,606,815 | Sowa | Apr. 12, 1952 |
| 2,628,896 | Erasmus et al. | Feb. 17, 1953 |